(12) United States Patent
Buerkle et al.

(10) Patent No.: US 6,511,093 B2
(45) Date of Patent: Jan. 28, 2003

(54) HEAD PROTECTION SYSTEM FOR OCCUPANTS OF MOTOR VEHICLES

(75) Inventors: Joerg Buerkle, Freising (DE); Josef Taubenberger, Bruckmuehl (DE); Gisela Diepold, Gilching (DE); Jens Schaper, Munich (DE); Markus Meister, Munich (DE); Hans-Peter Sertl, Kemnath (DE); Dirk Hardtmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/864,168

(22) Filed: May 25, 2001

(65) Prior Publication Data

US 2001/0052692 A1 Dec. 20, 2001

(30) Foreign Application Priority Data

May 25, 2000 (DE) .......................................... 100 26 026

(51) Int. Cl.⁷ ........................ B60R 21/22; B60R 21/18; B60R 21/24
(52) U.S. Cl. .................... 280/729; 280/730.2; 280/733
(58) Field of Search .......................... 280/730.2, 730.1, 280/733, 729

(56) References Cited

U.S. PATENT DOCUMENTS

| | | | | |
|---|---|---|---|---|
| 4,946,191 A | * | 8/1990 | Putsch | 280/730.2 |
| 5,238,263 A | * | 8/1993 | Sinnhuber | 280/730.2 |
| 5,393,091 A | * | 2/1995 | Tanaka et al. | 280/733 |
| 5,556,129 A | * | 9/1996 | Coman et al. | 280/730.2 |
| 5,791,685 A | * | 8/1998 | Lachat et al. | 280/743.1 |
| 6,073,961 A | * | 6/2000 | Bailey et al. | 280/730.2 |
| 6,113,135 A | * | 9/2000 | Tsutsumi | 280/730.2 |

FOREIGN PATENT DOCUMENTS

| | | |
|---|---|---|
| DE | 42 34 228 | 4/1994 |
| DE | 196 43 435 | 5/1997 |

* cited by examiner

Primary Examiner—Paul N. Dickson
Assistant Examiner—Laura B. Rosenberg
(74) Attorney, Agent, or Firm—Crowell & Moring LLP

(57) ABSTRACT

A head protection system for occupants of a motor vehicle has a multi-chamber air bag, which is inflated laterally of the head in the event of a side impact and prevents the displacement of the head. In addition, it protects the head from vehicle body parts that penetrate the occupant department. Via the individual chambers, an L-shape of the air bag can be constructed which is optimal for the desired purpose. In addition, the division into several chambers permits longer and therefore less aggressive inflation times.

18 Claims, 2 Drawing Sheets

HEAD PROTECTION SYSTEM FOR OCCUPANTS OF MOTOR VEHICLES

CROSS-REFERENCE TO RELATED APPLICATIONS

This application is related to co-pending U.S. patent application Ser. No. 09/864,165.

BACKGROUND AND SUMMARY OF THE INVENTION

This application claims the priority of German Application No. 100 26 026.8, filed May 25, 2000, the disclosure of which is expressly incorporated by reference herein.

The invention relates to a head protection system for occupants of motor vehicles having an inflatable air bag which, as required, is filled by a gas generator and which, in the inflated condition, extends laterally between the vehicle occupant's shoulder and head.

A head protection system of this type is known from European Patent Document EP 0 592 815 B1. An air bag is arranged on the upper section of a seat belt designed as a diagonal belt and is fastened by one end to the B-column of the vehicle body. The gas generator for filling the air bag is also situated in this area. The air bag is cut such that it forms a V-shape when inflating. The V-legs, which extend toward one another, point to the vehicle occupant's neck region.

In order to achieve its protective effect, the known head protection system must be inflated very rapidly; that is, the air bag must be filled at a high pressure. Only in this manner will it be ensured that, in the event of a lateral impact, the vehicle occupant's head will already be supported at the beginning of its displacement by the then already inflated air bag. Such a rapid filling of the air bag is also paraphrased as the "aggressiveness" of the system.

It is an object of the invention to further develop a head protection system of the above-mentioned type such that it exhibits a lower aggressiveness and, furthermore, can be used universally, that is, also in open vehicles, such as convertibles.

According to the invention, this object is achieved by providing a head protection system for occupants of motor vehicles having an inflatable air bag which, as required, is filled by a gas generator and which, in the inflated condition, extends laterally between the vehicle occupant's shoulder and head via seams, which define the individual wall sections of the air bag with respect to one another, the air bag is designed as a multi-chamber air bag with mutually connected partial chambers. The chambers provide the air bag in the inflated condition with an approximate L-shape, with a lower chamber which extends approximately horizontally along the vehicle occupant's shoulder, and at least one additional chamber which is upright thereto and extends upward along the neck and head area. The gas for inflating the air bag is fed into the upright chamber. The chambers support one another in the inflated condition. Further developments of the invention are described herein.

According to the invention, the air bag is therefore divided into several chambers which are connected with one another, so that the gas generated by the gas generator can flow from one chamber into another. As a result of their design, the chambers provide the air bag with an L-shape with a lower chamber which, similarly to the horizontally extending L-leg, extends along the vehicle occupant's shoulder. This is adjoined, corresponding to the perpendicular L-leg, by a second upright chamber which extends upward along the vehicle occupant's neck and head region.

This arrangement allows the upright chamber to be filled first. As a result, the occupant's head already finds a certain support on this air bag section at the beginning of its displacement. This air bag section also protects the occupant's head from vehicle body parts that penetrate toward it. The gas flows from the upper chamber into the lower chamber, which also fills up. Thus, in the event of a further displacement of the head, the upper chamber can support itself against the finally filled lower chamber, so that, on the whole, the vehicle occupant's head is held in a secure manner. Because of the resulting longer filling time, the system exhibits a less aggressive nature.

The invention is particularly suitable for open vehicles, such as convertibles. In the case of these vehicle types, no vehicle body sections exist in the form of B- or C-columns. The fixing of the head protection system according to the invention takes place in such cases in the area of the upper edge of the backrest of the vehicle seat. The gas generator itself can preferably be accommodated in the backrest or the headrest. To the extent that these seats are equipped with a so-called integrated belt system—all belt anchoring points are provided in or on the seat—, it is expedient to anchor the air bag on the belt strap. This can take place in a simple manner by a loop on the exterior side of the air bag through which the belt strap is guided.

Other objects, advantages and novel features of the present invention will become apparent from the following detailed description of the invention when considered in conjunction with the accompanying drawings.

DETAILED DESCRIPTION OF THE DRAWINGS

Figure 1:
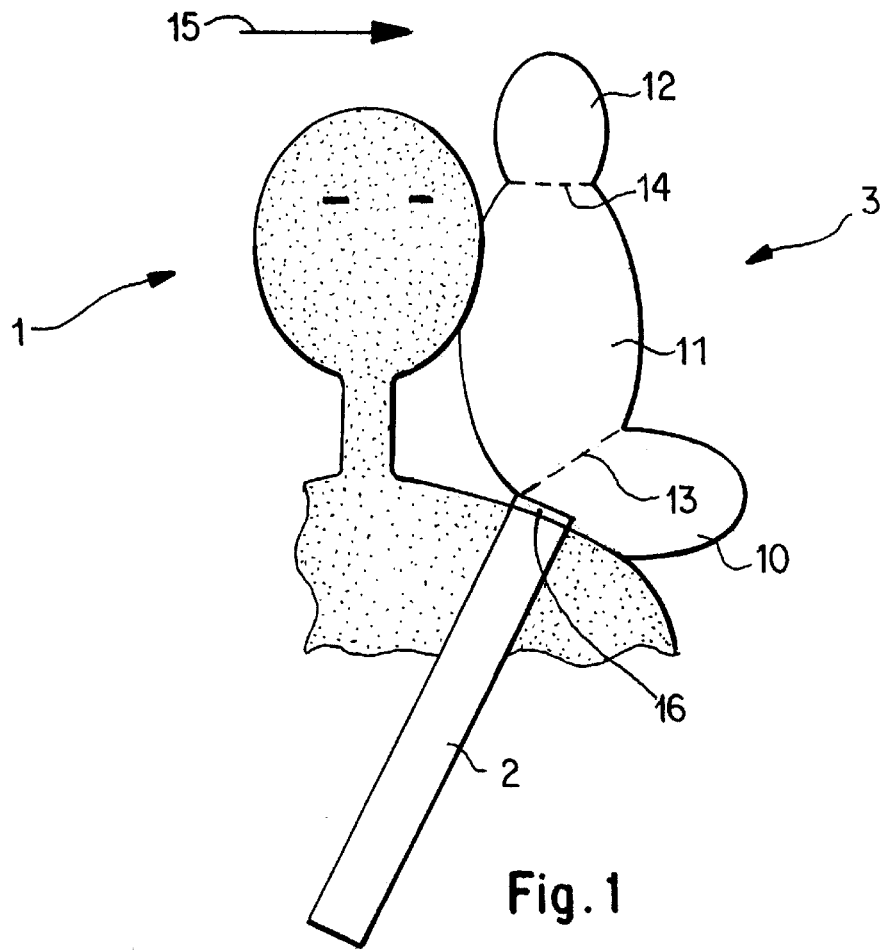
FIG. 1 is a schematic view of the upper body of a vehicle occupant with an inflated lateral air bag according to the invention.
Figures 2, 3:
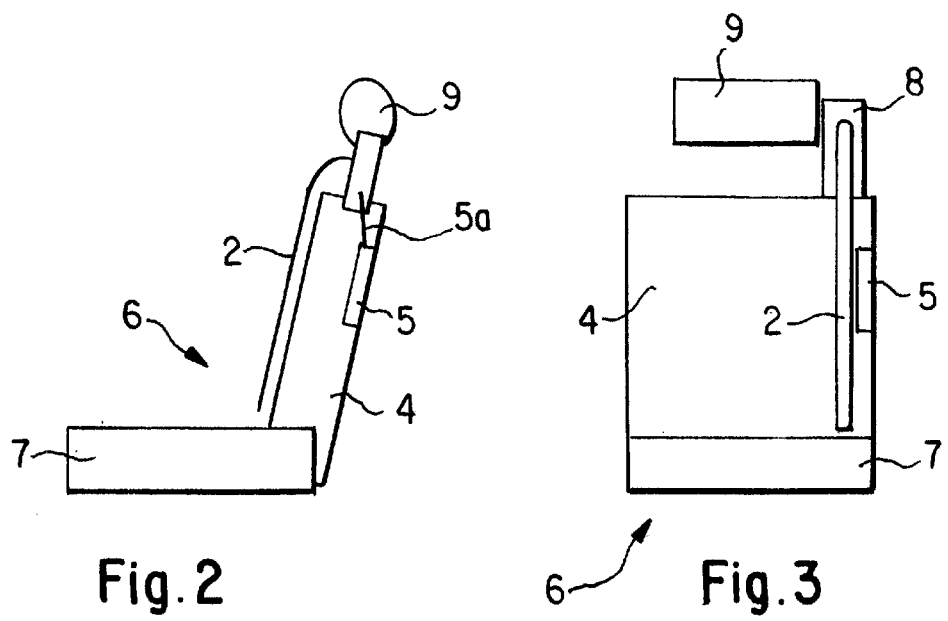
FIG. 2 is a reduced schematic lateral view of a vehicle seat with a head protection system, which is not activated.
FIG. 3 is a frontal view of the vehicle seat according to FIG. 2.
Figure 4:
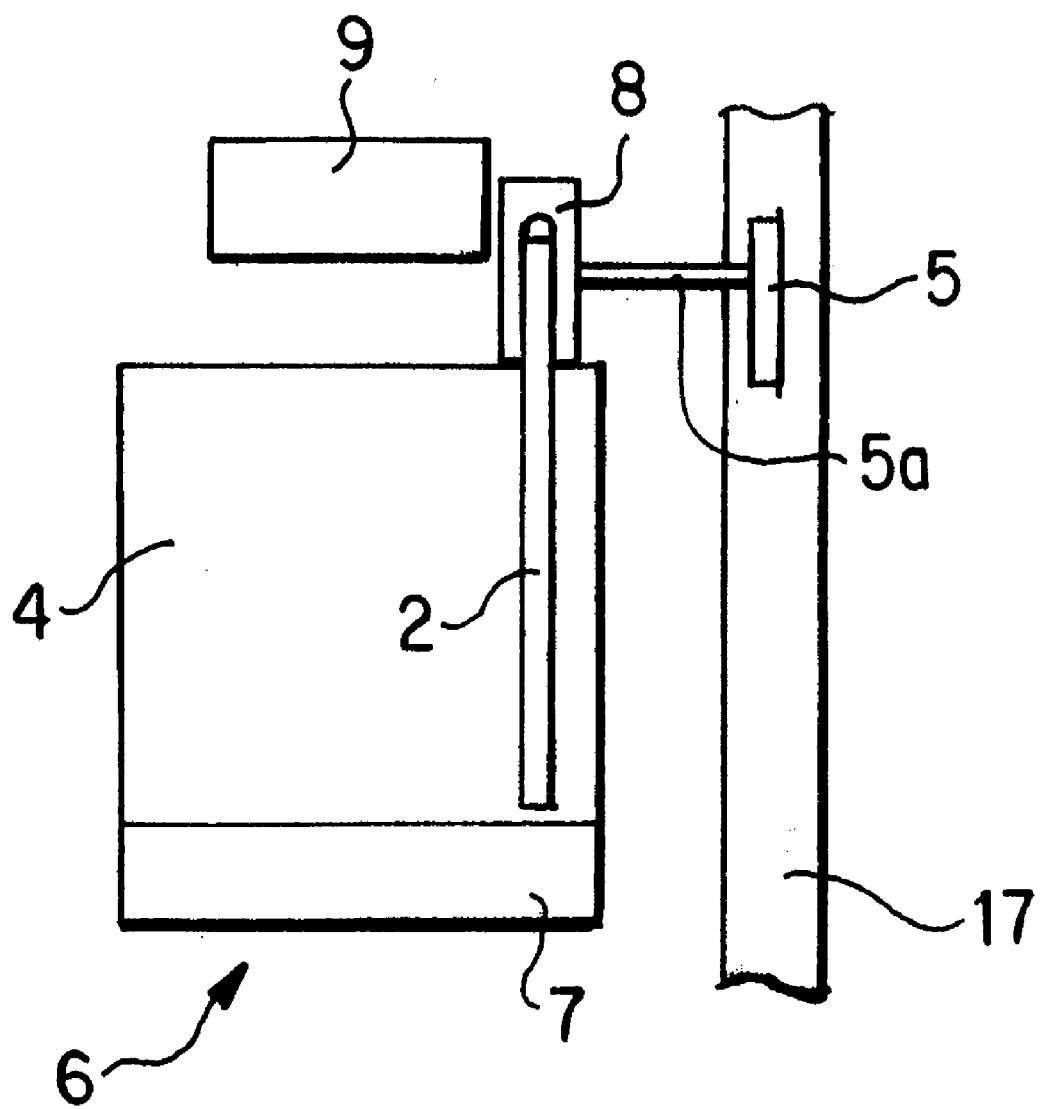
FIG. 4 is a schematic frontal view of the vehicle seat and head protection system in accordance with an alternative embodiment of the present invention.

The person schematically illustrated in FIG. 1 is the occupant 1 of a motor vehicle. A shoulder area and head area are visible, as well as a belt strap 2 of a three-point seat belt, which is not shown in detail. The seat belt 2 extends diagonally over the chest region of the occupant 1. An air bag, which as a whole has the reference number 3, is part of a head protection system which consists essentially of this air bag 3, a gas generator 5 arranged in a backrest 4 (FIGS. 2 and 3), and a feed line 5a between the gas generator 5 and the air bag 3. The gas generator 5 may just as well be accommodated in the headrest if sufficient space is available there. Finally, a vehicle-body-side mounting location is provided, for example, in the area of the B-column 17 in the case of a defined vehicle body shape, as can be seen in FIG. 4.

The backrest 4 is part of a vehicle seat 6, on which the occupant 1 sits down according to FIG. 1 and which is equipped with an integrated seat belt system. In the case of this belt system, according to FIG. 3, the belt strap 2 extends from a lower anchoring point provided in the area of a seat cushion 7 upward to a deflection device and from there—not visible—in the backrest back to a belt retractor. A buckle latch, which is also not visible and through which the belt strap 2 is looped, can be anchored in a belt buckle, which is not shown, on the opposite side of the seat cushion. The deflection device is provided with a displaceable support 8 which holds a vertically adjustable headrest 9. The head protection system is also held on the support 8.

The air bag 3 is inflated according to FIG. 1. In this condition, it forms three chambers 10, 11, 12 and has an approximate L-shape. A first chamber 10 virtually corresponds to a horizontal lower L-leg and extends correspondingly along the vehicle occupant's 1 shoulder. This chamber 10 is adjoined in the upright direction by an upright chamber 11—corresponding to the perpendicular L-leg—which changes into a small chamber 12. These two chambers 11, 12 extend from the neck region to the head region of the occupant 1. The individual chambers are formed by using seams 13, 14 which connect opposite wall areas of the air bag 3 with one another such that gas can flow from one chamber into another. Finally, the belt strap 2 extends through a loop 16 mounted on the exterior side of the chamber 10.

When a side impact is detected by means of a sensor not shown in detail, the gas generator 5 will ignite and gas will flow by way of line 5*a* (FIG. 2) into the chamber 11. This chamber 11 is first inflated by itself and chambers 10 and 12 will then fill up only gradually. As a result of the impact, the occupant's 1 head is displaced in the direction of the arrow 15 and finds a first support on chamber 11 which was inflated early. To the extent that parts of the vehicle body penetrate into the occupant compartment in this area, chamber 11 protects the head from these parts. When the displacement forces rise, chamber 11 is increasingly supported on chamber 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A head protection system for an occupant of a motor vehicle, comprising:
    an inflatable air bag which, in use, is filled by a gas generator and is disposed laterally between a vehicle occupant's shoulder and head in an inflated condition;
    wherein the air bag is a multi-chamber air bag having mutually connected partial chambers, said chambers being separated by seams defining individual wall sections of the air bag with respect to one another;
    wherein said chambers provide the air bag in the inflated condition with an approximate L-shape, with a lower chamber extending approximately horizontally above the vehicle occupant's shoulder when in use, and at least one additional chamber arranged upright thereto so as to extend upward along an occupant's neck and head area when in use; and
    wherein gas for inflating the air bag is fed into the upright chamber directly from the gas generator and wherein the chambers support one another in the inflated condition.

2. The head protection system according to claim 1, wherein the upright chamber is divided into several partial chambers.

3. The head protection system according to claim 1, further comprising:
    a motor vehicle seat belt which extends diagonally over the vehicle occupant's chest region;
    a vehicle seat in which the seat belt is integrated;
    wherein the head protection system is arranged in an area of an upper edge of a seat backrest, and wherein a belt strap of the seat belt is guided through a loop mounted on an exterior wall of the inflatable air bag.

4. The head protection system according to claim 2, further comprising:
    a motor vehicle seat belt which extends diagonally over the vehicle occupant's chest region;
    a vehicle seat in which the seat belt is integrated;
    wherein the head protection system is arranged in an area of an upper edge of a seat backrest, and wherein a belt strap of the seat belt is guided through a loop mounted on an exterior wall of the inflatable air bag.

5. The head protection system according to claim 3, wherein the gas generator for filling the air bag is housed within one of the backrest or headrest of the vehicle seat.

6. The head protection system according to claim 4, wherein the gas generator for filling the air bag is housed within one of the backrest or headrest of the vehicle seat.

7. The head protection system according to claim 3, wherein the gas generator is housed in a B-column of the vehicle-body.

8. The head protection system according to claim 4, wherein the gas generator is housed in a B-column of the vehicle-body.

9. A head protection system for an occupant of a motor vehicle, comprising:
    an inflatable air bag which is filled by a gas generator and is disposed in an area of a headrest of the vehicle and a top portion of a backrest of a seat of the vehicle in an inflated condition;
    wherein the air bag is a multi-chamber air bag having mutually connected partial chambers, said chambers being separated by seams defining individual wall sections of the air bag with respect to one another;
    wherein said chambers provide the air bag in the inflated condition with an approximate L-shape, with a lower chamber extending approximately horizontally above the top portion of the backrest, and at least one additional chamber arranged upright thereto so as to extend upward approximately along the headrest; and
    wherein gas for inflating the air bag is fed into the upright chamber directly from the gas generator and wherein the chambers support one another in the inflated condition.

10. The head protection system according to claim 9, wherein the upright chamber is divided into several partial chambers.

11. The head protection system according to claim 9, further comprising:
    a motor vehicle seat belt integrated into the seat of the vehicle;
    wherein a belt strap of the seat belt is guided through a loop mounted on an exterior wall of the inflatable air bag.

12. The head protection system according to claim 9, wherein the gas generator is housed within one of the backrest or headrest.

13. The head protection system according to claim 9, wherein the gas generator is housed in a B-column of a body of the vehicle.

14. A method for protecting the head of an occupant of a motor vehicle with a head protection system where the head protection system includes an inflatable air bag and wherein the air bag is a multi-chamber air bag having mutually connected partial chambers separated by seams defining individual wall sections of the air bag and wherein the chambers provide the air bag in an inflated condition with an approximate L-shape with a lower chamber extending approximately horizontally above a top portion of a backrest of a seat of the vehicle and at least one additional chamber arranged upright with respect to the lower chamber so as to extend upward approximately along a headrest of the seat, comprising the steps of:

supplying gas for inflating the air bag directly from a gas generator into the upright chamber; and supplying gas from the upright chamber into the lower chamber.

15. The method according to claim 14, wherein the upright chamber is divided into several partial chambers.

16. The method according to claim 14, further comprising the step of guiding a belt strap of a seat belt through a loop mounted on an exterior wall of the inflatable air bag.

17. The method according to claim 14, wherein the gas generator is housed within one of the backrest or headrest.

18. The method according to claim 14, wherein the gas generator is housed in a B-column of a body of the vehicle.

* * * * *